United States Patent [19]

Sauer et al.

[11] Patent Number: 5,176,050
[45] Date of Patent: Jan. 5, 1993

[54] TOLL FOR THE APPLICATION OF PREDETERMINED TORQUE TO BOLTS, NUTS AND THE LIKE

[75] Inventors: Heinz Sauer, Ronneburg; Dieter Spindelböck, Pfaffenhofen, Fed. Rep. of Germany

[73] Assignee: Rasmussen GmbH, Maintal, Fed. Rep. of Germany

[21] Appl. No.: 651,572

[22] Filed: Feb. 6, 1991

[30] Foreign Application Priority Data

Feb. 13, 1990 [DE] Fed. Rep. of Germany ....... 4004261

[51] Int. Cl.⁵ .......................................... B25B 23/153
[52] U.S. Cl. ...................................... 81/471; 81/467; 81/180.1
[58] Field of Search .................. 81/180.1, 471, 477, 81/467, 468, 125, 121.1

[56] References Cited

U.S. PATENT DOCUMENTS

| | | | |
|---|---|---|---|
| 2,260,055 | 10/1941 | Reardon | 81/125 |
| 3,331,267 | 7/1967 | Tietge | 81/52.4 |

FOREIGN PATENT DOCUMENTS

| | | | |
|---|---|---|---|
| 2231949 | 2/1973 | Fed. Rep. of Germany | 81/471 |
| 2941438 | 4/1980 | Fed. Rep. of Germany | |
| 2378969 | 8/1978 | France | |
| 2486852 | 1/1982 | France | 81/471 |
| 2560100 | 8/1985 | France | |

Primary Examiner—Bruce M. Kisliuk
Assistant Examiner—Lawrence Cruz
Attorney, Agent, or Firm—Peter K. Kontler

[57] ABSTRACT

A tool for the application of selected torque to the polygonal head of a bolt, to a nut or to an analogous component has a first portion which is a snug fit on the polygonal part of the component, and a polygonal second portion which can be engaged and rotated by a wrench. The material of the tool is more readily deformable than the material of the component and the material of the wrench so that the wrench deforms the second portion and/or the component deforms the first portion of the tool when the component offers a selected resistance to further rotation, i.e., in response to the application of a selected torque to the component. The first portion can be bonded or molded to the torque-receiving part of the component to be rotated, and the second portion can be coated with a film of a color different from that of the second portion to facilitate visual determination of the condition of the second portion. The tool can be provided with a third portion which can be used for the application of a different torque, or the second portion can be deformed in two or more stages to permit the application of torque in several stages or to permit the application of one of two or more different torques.

19 Claims, 1 Drawing Sheet

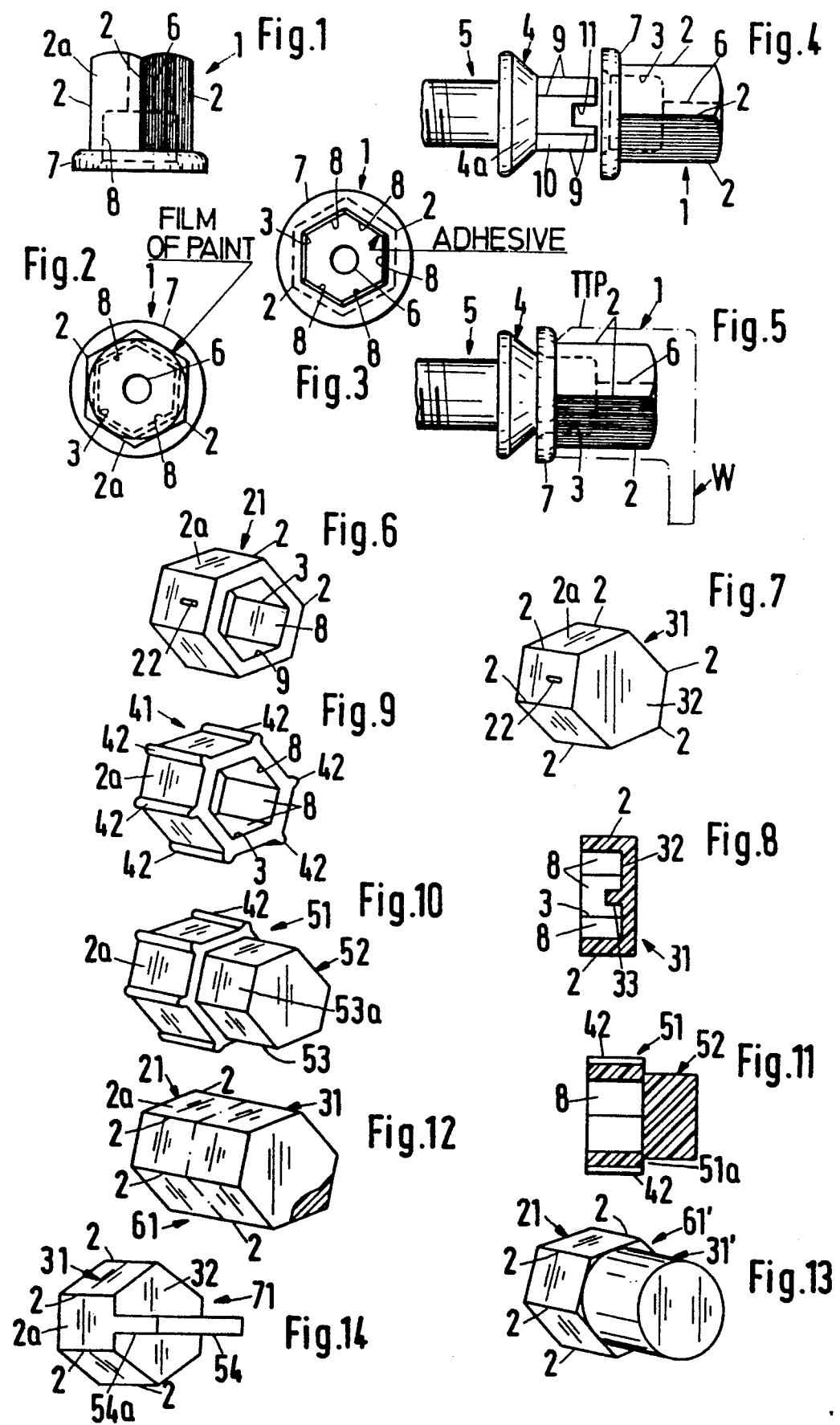

TOLL FOR THE APPLICATION OF PREDETERMINED TORQUE TO BOLTS, NUTS AND THE LIKE

BACKGROUND OF THE INVENTION

The invention relates to improvements in torque applying or torquing tools, namely to tools which can be used to apply a predetermined torque to bolts, nuts and analogous components having a non-circular torque-receiving part. Typical examples of such torque-receiving parts are the heads of bolts and the facetted external surfaces of nuts.

It is often desirable or necessary to apply a predetermined torque to a bolt, nut or an analogous component in order to reduce the likelihood or danger of damage or injury. For example, the bolt or bolts which are used to tighten the straps of hose clamps under the hood of a motor vehicle must be tightened with a certain force to prevent the escape of fuel, combustion products or other flowable media. This can be achieved by resorting to a torque wrench which is provided with a calibrated torque rod or another suitable torque monitoring and indicating device and can be manipulated by hand or by a motor. Torque wrenches are expensive and are often not available to a person who wishes to apply a selected torque to a nut, a bolt or a like rotary component.

Published French patent application No. 2 378 969 of Etablissements Caillau proposes to provide the head of a bolt in a hose clamp with a weakened central portion between two polygonal portions one of which is integral with the shank of the bolt and the other of which can be rotated by a wrench or the like. When the one polygonal portion encounters a predetermined resistance to rotation while the other polygonal portion is rotated by a wrench or the like, the central portion breaks and this indicates to the operator that a predetermined torque has been applied to the bolt. A drawback of the just described bolt is that it is not a serially produced staple article. Moreover, the broken central portion is subject to corrosion and exhibits sharp portions which are likely to injure the hand of an operator.

U.S. Pat. No. 3,331,267 to Tietge discloses a two-piece torquing tool including a sleeve having a polygonal internal surface to be placed around the external surface of a nut or around the head of a bolt, and a polygonal plug. The plug has a first portion which is received in the sleeve, a second portion which can be engaged by a wrench to rotate the sleeve and the nut or the bolthead which is surrounded by the sleeve, and a weakened third portion between the first and second portions. The third portion breaks when the component which is being rotated by the sleeve begins to offer a certain resistance to further rotation. This torquing tool exhibits the same drawbacks as that of Caillau and is even more expensive because it must be assembled of two parts neither of which is a serially produced staple article capable of being put to other uses in the same way as a standard screw or bolt.

Other types of breakable torquing tools are disclosed in French Utility Model No. 2 560 100 of Manier and in published German patent application No. 29 41 438 of Kesselman. All of the above described conventional torquing tools exhibit the drawback that a portion of the tool breaks away or that the tool is ripped open when the component which is being rotated begins to exhibit a predetermined resistance to further rotation. Thus, at least a portion of the tool becomes separated from the component which has been rotated and such portion is likely to fall into a machine where it can cause damage (e.g., under the hood of a motor vehicle). Once the tool is separated from the component to which a predetermined torque was applied, an inspection of the component cannot reveal whether or not a predetermined torque has been applied thereto (unless the person in charge uses a torque wrench with a graduated scale to indicate the resistance which the component offers to any further rotation. Still further, a once used conventional tool must be discarded since an essential part has been sheared off or the entire tool was ripped open to thus prevent any renewed use.

OBJECTS OF THE INVENTION

An object of the invention is to provide a simple and inexpensive torquing tool which can be used for the application of torque to standard bolts, nuts and like components and which can be rotated by available implements, such as wrenches and the like.

Another object of the invention is to provide a torquing tool which can apply a selected torque without subdivision into several discrete parts and which can furnish, at any desired time, information concerning the magnitude of torque which was applied therewith.

A further object of the invention is to provide a torquing tool which can be used to apply to a nut, a bolt or a like component one of a plurality of predetermined torques.

An additional object of the invention is to provide the torquing tool with novel and improved means for indicating its condition, and hence the magnitude of applied torque.

Still another object of the invention is to provide a torquing tool which can be constructed and applied in such a way that it cannot be lost or misplaced subsequent to its utilization as a means for applying a predetermined torque or as a means for applying one of a plurality of predetermined torques.

A further object of the invention is to provide a torquing tool which is constructed and configurated in such a way that a simple visual inspection suffices to ascertain its condition and the magnitude of torque which was applied therewith.

SUMMARY OF THE INVENTION

The invention is embodied in a torque transmitting or torquing tool which can be used to apply predetermined torque to bolts, nuts an analogous rotary components of the type having a non-circular torque-receiving part (such as the head of a bolt) which exhibits a first resistance to deformation. The improved tool comprises a torque-transmitting first portion (e.g., a socket having a polygonal cross-sectional outline) which is substantially complementary to and is engageable with the torque-receiving part of a component to which torque is to be applied, and a non-circular torque-receiving second portion which is engageable by a complementary torque-transmitting part of a wrench which exhibits a second resistance to deformation. The second portion serves to transmit torque to the first portion, and at least one of these portions exhibits a third resistance to deformation which is less than the first and second resistances so that, when the wrench rotates the second portion to apply torque to a component by way of the first portion, the at least one portion undergoes deformation and at such time ceases to transmit torque when the component begins to offer a predetermined resistance to rotation.

The first portion of the torquing tool can be configurated to be form-lockingly connected with the torque-receiving part of a component and/or the second portion can be configurated to be form-lockingly connected with the torque-transmitting part of a wrench.

At least one of the first and second portions can have a polygonal cross-sectional outline. For example, the at least one portion of the torquing tool can have a polygonal cross-sectional outline and then includes facets and edges alternating with the facets. Such portion then undergoes deformation in the region of the edges when the component which is engaged by the first portion offers the predetermined resistance to rotation.

If the torque-receiving part of the component to be rotated has a slot, e.g., a slot for the working end of a screwdriver which can be used in lieu of or jointly with the improved torquing tool, the first portion can constitute a socket having an internal projection (e.g., a diametrically extending rib) which enters the slot when the first portion of the tool receives the component which is to be rotated.

The second portion of the tool can be provided with an external surface which is engageable by the torque-transmitting part of a wrench and is provided with at least one protuberance (e.g., in the form of an elongated bead) which is separated from the second portion when the component to be rotated begins to offer the predetermined resistance to rotation. The external surface can include a plurality of facets and edges which alternate with the facets. A protuberance can be provided along each edge of the external surface. The just outlined tool (or a tool which does not comprise one or more protuberances) can further comprise a non-circular torque-receiving third portion which is adjacent and serves to transmit torque to the second portion (and hence also to the first portion). The third portion is engageable by a complementary torque-transmitting part of a wrench (e.g., the same wrench which is used to transmit torque to the second portion) to rotate the second portion. The third portion of the tool exhibits a fourth resistance to rotation, and the fourth resistance is selected in such a way that the third portion undergoes deformation when the component which is to be rotated and which is engaged by the first portion begins to offer to rotation a second resistance, particularly a resistance which at most equals the predetermined resistance. The arrangement may be such that the third portion becomes at least partly separated from the other two portions when the component which is engaged by the first portion offers the second resistance to rotation.

The first portion can be dimensioned to be a press fit on the torque-receiving part of a component. This ensures that the improved tool and a component to be rotated can be assembled prior to the application of torque to the second portion of the tool by a wrench or the like. The same result can be achieved if the tool further comprises means (e.g., a layer of adhesive) for securing the first portion of the tool to the torque-receiving part of a component, e.g., a bolt which serves to tension the strap of a hose coupling or the like.

The external surface of the second portion of the tool can be provided with at least one projection (e.g., an axially parallel rib) which is frictionally engageable by the torque-transmitting part of a wrench.

The at least one portion of or the entire torquing tool can be made of a plastic material. Alternatively, the at least one portion or the entire tool can be made of a metallic material, such as a cast metal.

The tool can be further provided with means for facilitating visual determination of deformation of the at least one portion. This can be achieved by coating the at least one portion with a film of paint or any other suitable material having a color which is different from the color of the at least one portion. The film is at least partially removed is response to deformation of the at least one portion (i.e., by the torque-receiving part of a component or by the torque-transmitting part of a wrench) to thus expose the color of the at least one portion. This informs an observer that the at least one portion has undergone deformation, i.e., that the component which is engaged by the first portion of the tool already offers the predetermined resistance to rotation (this, in turn, indicates that a predetermined torque has been applied to such component).

The novel features which are considered as characteristic of the invention are set forth in particular in the appended claims. The improved torquing tool itself, however, both as to its construction and the mode of using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a side elevational view of a torquing tool which embodies one form of the invention;

FIG. 2 is a top plan view of the tool;

FIG. 3 is a bottom plan view of the tool;

FIG. 4 is a side elevational view of the tool which is shown adjacent the torque-receiving head of a bolt;

FIG. 5 shows the structure of FIG. 4 but with the head of the bolt received in the first portion of the tool, a portion of a wrench which is used to rotate the tool being indicated by phantom lines;

FIG. 6 is a perspective view of a second torquing tool;

FIG. 7 is a perspective view of a third torquing tool;

FIG. 8 is an axial sectional view of the tool which is shown in FIG. 7;

FIG. 9 is a perspective view of a fourth torquing tool;

FIG. 10 is a perspective view of a fifth torquing tool which constitutes a modification of the tool of FIG. 9 and further includes a third portion;

FIG. 11 is an axial sectional view of the fifth tool;

FIG. 12 is a perspective view of a sixth torquing tool;

FIG. 13 is a similar perspective view of the sixth tool but subsequent to partial deformation of the second portion; and FIG. 14 is a perspective view of a seventh torquing tool.

DESCRIPTION OF PREFERRED
EMBODIMENTS

The torquing tool 1 which is shown in FIGS. 1 to 5 comprises a first or inner portion in the form of a socket having an internal surface with six flat facets 8 which alternate with axially parallel edges 3. The first portion is integral with a second or outer portion having an external surface composed of six flat facets 2*a* which alternate with axially parallel edges or corners 2. One end of the tool 1 is further provided with an external flange 7 and the other end of the tool has an axial hole or bore 6 which communicates with the space within the internal surface including the facets 8.

The outer portion of the tool 1 can receive torque from the complementary torque-transmitting part TTP of a wrench W which is shown in FIG. 5 by phantom lines. The socket at the illustrated end of the wrench can receive the second portion of the tool 1, either entirely or in part, and such wrench serves to rotate the first portion by way of the second portion. The first portion of the tool 1 can be applied to a complementary part of a component 5 which is to receive a predetermined torque. The torque-receiving part of the component 5 (e.g., a bolt of the type used in certain types of hose clamps) is the outer end portion of the head 4, and such outer end portion has an external surface composed of six facets 10 alternating with axially parallel edges 9. The end face of the facetted outer end portion of the head 4 is provided with a diametrically extending slot 11 for the working end of a screwdriver, not shown. The working end can extend into the slot 11 before the outer end portion of the head 4 is received in the first portion of the tool 1 or thereafter; in the latter instance, the working end is introduced through the hole 6 and can be used to apply to the component 5 additional torque or to loosen the hose clamp which includes the component 5.

The illustrated wrench W is a socket wrench or box wrench; however, it is equally possible to employ an open-end wrench, an adjustable wrench or any other suitable implement as a means for transmitting torque to the second portion of the tool 1.

If the component 5 is to receive predetermined torque, the tool 1 is first aligned with the head 4 (see FIG. 4) and the first portion is then pushed onto the outer end portion including the facets 10 and the slot 11 until the flange 7 reaches the adjacent frustoconical inner end portion 4a of the head 4. The dimensions of the space within the socket-shaped first portion of the tool 1 are such that the tool cannot rotate relative to the component 5 when the outer end portion of the head 4 is received in the first portion. The part TTP is then applied over the second portion of the tool 1 (again in such a way that the wrench W cannot rotate relative to the tool 1), and the tool is then ready to apply torque to and to rotate the component 5 in response to manipulation of the wrench W in a sense to rotate the second portion (including the facets 2a) and to thereby rotate the head 4 by way of the first portion.

The wrench W begins to turn relative to the second portion of the tool 1 and/or the first portion of the tool 1 begins to turn relative to the head 4 when the component 5 begins to offer a predetermined resistance to further rotation. This is due to the fact that the resistance of the material of the first portion of the tool 1 to deformation is less pronounced than the resistance of the material of the head 4 and/or that the deformation resistance of the second portion of the tool 1 is less than the deformation resistance of the torque-transmitting part TTP of the wrench W. This ensures that the first portion is deformed in lieu of the head 4 and/or that the second portion is deformed in lieu of the part TTP when the operator or a machine continues to manipulate the wrench W in a sense to turn the second portion of the tool 1 at a time when the component 5 already offers a predetermined resistance to further rotation, i.e., when the tool 1 has already applied a predetermined torque.

The deformed first and/or second portion of the tool 1 exhibits less pronounced edges 3 or 2, or the edges disappear altogether and the corresponding surface of the tool 1 becomes a more or less cylindrical surface, i.e., a surface having a circular cross-sectional outline.

FIG. 3 shows that the outermost ends of the facets 8 of the first portion of the tool 1 flare outwardly at the open end of the space which is bounded by the facets 8 and edges 3. Furthermore, the dimensions of the first portion of the tool 1 can be selected in such a way that the first portion is a press fit or tight friction fit on the outer end portion of the head 4. This is desirable and advantageous because, and particularly if the second portion of the tool 1 is deformed by the part TTP of the wrench W before the first portion would have undergone deformation by the head 4, the tool 1 continues to adhere to the outer end portion of the head 4 and its deformation is readily visible, i.e., a person looking at the tool upon completion of the torque applying operation can see that the external surface is devoid of edges 2 or that such edges are rounded to thus indicate that the application of predetermined torque to the component 5 and to the device (e.g., a hose clamp) which is secured by the component 5 has been completed.

The tool 1 can be made of a thermoplastic synthetic plastic material. However, it is also possible to make the tool 1 from a suitable metallic material, e.g., cast metal.

The socket of the torque-transmitting part TTP of the wrench W can receive the second portion of the tool 1 with a certain amount of play as long as the part TTP is in form-locking engagement with (i.e., it is complementary to) the second portion so that the wrench can transmit torque to the second portion and the second portion can apply torque to the head 4 by way of the first portion of the tool 1. The same holds true for the first portion of the tool 1 and for the outer end portion of the head 4, i.e., the first portion can receive the outer end portion with a certain amount of play as long as the tool 1 is maintained in form-locking engagement with (i.e., as long as it is complementary to) the head 4.

As mentioned above, the first portion of the tool 1 can be a press fit on the outer end portion of the head 4. However, it is equally within the purview of the invention to mount the first portion with at least some clearance so that the tool 1 can be slipped off the head 4 when the transmission of a predetermined torque is completed.

The hole 6 serves the additional purpose (or the only purpose if the outer end portion of the head 4 is not provided with a slot 11) to permit escape of air from the interior of the first portion of the tool 1 while the outer end portion of the head 4 is caused to penetrate into the first portion. Escape of air from the first portion is particularly important if the dimensions of the first portion of the tool 1 are selected with a view to ensure that the first portion is a press fit on the outer end portion of the head 4.

The material as well as the dimensions of the tool 1 can be readily selected in such a way that one of its portions, preferably the second portion including the facets 2a and the edges 2 undergoes deformation prior to deformation of the outer end portion of the head 4 and/or of the torque-transmitting part TTP of the wrench W when the component 5 begins to offer a preselected resistance to further rotation by the tool 1, i.e., when the application of a predetermined torque is completed.

The torquing tool 1 is a relatively simple, lightweight and inexpensive article which can be mass produced from a variety of suitable plastic or metallic materials at a low cost. Therefore, the once-used tool 1 can be discarded (if it does not remain a press fit on the outer end portion of the head 4) or recycled for conversion into a fresh torquing tool.

An important advantage of the improved torquing tool is its simplicity. This renders it possible to mass produce the tool at a low cost. The tool resembles a sleeve which has internal and external facets (8, 2a) alternating with axially parallel edges (3, 2). Moreover, the tool can be rotated by any conventional implement, such as standard pliers or wrench pliers, an open-end wrench, an adjustable wrench, a box wrench or any other implement which can be placed into form-locking engagement with the external facets 2a of the second portion of the tool. It is also possible to employ a convertible wrench with a replaceable or interchangeable socket.

A further important advantage of the improved torquing tool is that the magnitude of torque which is to be applied to the component 5 or to an analogous component (e.g., to a nut) can be selected with a high degree of accuracy. Thus, the dimensions, shape and material of the first and/or second portion of the tool can be readily selected in such a way that the first portion begins to rotate relative to the component 5 and/or that the wrench W begins to rotate relative to the second portion when the application of a desired or required torque is completed. It is often desirable to design the tool in such a way that the wrench W begins to turn on the deformed second portion when the application of a selected torque is completed. This ensures that the deformed portion can be immediately seen by looking at the tool while the tool remains attached to (e.g., a snug fit on or bonded to) the torque-receiving part of the component 5 or an analogous component.

The improved tool can be used twice or more than twice, i.e., for the application of prescribed torque or two or more discrete components 5. This can be achieved by applying the torque-transmitting part TTP to the second portion (2, 2a) of the tool 1 in such a way that a first application involves the deformation of one-half, one-third or another part of the second portion. The tool 1, with the partially deformed second portion, is then transferred onto a second component and the wrench W is used again or another wrench is put to use to rotate the tool by way of the second portion until the other half, the second third or another part of the second portion 2, 2a becomes deformed. Still further, a first component 5 can receive a first torque (e.g., as a result of deformation of one-third of the second portion), and a second component can receive a different (e.g., larger) torque as a result of deformation of the other two thirds of the second portion. Thus, the versatility of the improved tool is surprisingly pronounced in spite of its simplicity and low cost.

FIG. 6 shows a modified torquing tool 21 which resembles a sleeve with six external facets 2a alternating with six axially parallel edges 2, and with six internal facets 8 alternating with six axially parallel edges 3. Both ends 9 of the tool 21 are open and at least one external facet 2a is provided with an axially parallel rib-like projection 22 which facilitates detachment of the inner or first portion (including the facets 8) from the outer end portion of the head 4 of a component 5 (not shown in FIG. 6). If the outer end portion of the head 4 is shorter than the sleeve-like tool 21, the tool can be rotated by an externally facetted wrench which is inserted into the tool, e.g., all the way into abutment with the outer end face of the head. Alternatively, the second portion (including the facets 2a) of the tool 21 can be engaged and rotated by the torque-transmitting portion TTP of the wrench W or a similar implement (not shown in FIG. 6).

The material of the sleeve-like tool 21 is selected in such a way that the tool undergoes deformation when the component 5 begins to offer a predetermined resistance to further rotation by a wrench which surrounds the second portion or by a wrench which extends into the first portion of the tool. The deformation can take place at the outer edges 2 and/or at the inner edges 3. For example, if a part of a wrench is inserted into the tool 21, the inserted part can deform the adjacent portions of the inner edges 3 so that the corresponding portion of the internal surface of the tool exhibits a circular or nearly circular outline.

An advantage of the tool 21 is that it is even simpler than the tool 1 because its cross-section is constant from end to end. Moreover, the versatility of this tool is even more pronounced than that of the tool 1. Thus, the tool 21 can be rotated by a wrench W of the type shown in FIG. 5 or by a wrench having a polygonal working end which can enter the axial passage of the tool 21 at that end 9 which is remote from the torque-receiving part 9-10 of a head 4 extending into the tool by way of the other open end 9. This feature is desirable and advantageous when the tool 21 is used in a space which does not permit the application of the torque-transmitting part TTP of a socket wrench, adjustable wrench, open-end wrench or a like implement but provides room for insertion of the working end of a rod-like wrench into the axial passage of the tool 21.

FIGS. 7 and 8 show a substantially cup-shaped torquing tool 31 which differs from the tool 21 in that one of its ends is closed by an end wall 32 having a diametrically extending internal projection in the form of a rib 33 which can enter the slot 11 when the outer end portion of the head 4 of a component 5 is inserted into the inner portion of the tool 31. The projection 33 reduces the likelihood of rotation of the first portion (including the internal facets 8 and the internal edges 3) of the tool 31 relative to the outer end portion of the head 4 to thus ensure that the external edges 2 are deformed when the component 5 begins to offer a predetermined resistance to further rotation by the tool 31. The second portion of this tool includes the external facets 2a and the external edges 2. The projection 33 can extend all the way across the internal space which is surrounded by the first portion of the tool 31.

An advantage of the cupped or cap-shaped tool 31 is that it need not be provided with a flange 7 but still ensures that the torque-receiving part 9, 10 of a component 5 is properly received in and is in proper form-locking engagement with its first portion including the facets 8 and edges 3. Thus, insertion of the outer end portion of a head 4 is automatically completed when the projection 33 of the end wall enters the slot 11 at the outer end of the head 4.

FIG. 9 illustrates a further torquing tool 41 which is similar to the tool 21 except that the edges of its second or outer portion are provided with protuberances in the form of elongated beads 42. The second portion of the tool 41 is receivable in a complementary torque-transmitting part of a wrench which causes the protuberances 42 to become separated from the remainder of the second portion of the tool 41 when the component 5 which is being rotated by the tool begins to offer a predetermined resistance to further rotation. This enables the torque-transmitting part of the wrench to turn around the outer facets 2a which indicates to the operator that the application of a predetermined or preselected torque is completed. Moreover, a glance at the exterior of the tool 41 suffices to detect the absence of one or more protuberances 42 which, in turn, denotes that the component which carries the tool 41 (minus protuberances 42) has been tightened as a result of the application of prescribed torque.

The first portion (including the facets 8) of the tool 41 is or can be a press fit on the outer end portion of the head 4 of a component 5 or any other component which has a torque-receiving part adapted to fit snugly into the space which is surrounded by the facets 8.

Another advantage of the tool 41 is that it can be put to use a second time, i.e., subsequent to separation of the protuberances 42. This might be desirable and advantageous under certain circumstances. For example, if the component 5 which is being rotated by the tool 41 until the protuberances 42 become separated from the remainder of the first portion of the tool is a bolt which is used to tighten a clamp around an elastically deformable hose in a hose coupling or in a like connection, the elasticity of the material of the hose is likely to become less pronounced subsequent to initial clamping, either immediately or after elapse of a certain interval of time. Therefore, the facets 2a of the second portion of the tool 41 can be thereupon engaged (preferably with a certain amount of play but still form-lockingly) by a standard wrench which causes the tool 41 to rotate again in order to tighten, for a second time, the clamp around the end portion of the hose. Such second tightening is terminated when the wrench begins to turn about the second portion of the tool 41 (i.e., around a second portion which is devoid of protuberances 42). The wrench which is used to rotate the tool 41 for a second time causes a rounding of the edges which have developed as a result of separation of the protuberances 42 in the course of the first tightening operation. Certain hose couplings which utilize bolts as a means for clamping the end of a hose are described and shown in U.S. Pat. Nos. 4,244,088, 4,300,270, 4,418,448 and 4,468,840 of the assignee of the present application. The torque $M_2$ which can be applied to a component 5 in response to second rotation of the tool 41 (by a wrench which acts upon the facets 2a subsequent to separation of the protuberances 42) can match or can at least slightly exceed the torque $M_1$ which has been applied to the component 5 at the time of separation of the projections 42.

Another reason for rotating the tool 41 is simply for the sake of security and safety. Thus, the torque which is required to effect separation of the protuberances 42 might suffice but the application of torque to the facets 2a subsequent to separation of the protuberances 42 can entail an even more secure and reliable tightening of the element or elements which are clamped by the device employing the component 5. In other words, there are circumstances under which it is desirable and advantageous to apply torque in two successive steps or stages.

The torquing tool 51 of FIGS. 10 and 11 constitutes a modification of the tool 41 of FIG. 9. The difference is that one end of the sleeve-like section which includes the first and second portions of the tool 51 is sealed by a third portion 52 which has external facets 53a alternating with axially parallel edges 53. The third portion 52 can constitute a solid hexagonal block of plastic or metallic material and is secured to the first and second portions by a relatively thin web 51a which can be designed to break in response to the application of predetermined torque by a wrench which has a torque-transmitting part surrounding the third portion 52. The edges 53 disappear or become less pronounced when the application of a predetermined torque by way of the third portion 52 is completed, i.e., when the component 5 which is engaged by the first portion including the internal facets 8 offers a predetermined resistance to further rotation. The magnitude of torque $M_2$ which must be applied to the third portion 52 in order to deform this third portion at the edges 53 can be less than or can at most equal the magnitude of torque $M_1$ which must be applied to the second portion (including the facets 2a) of the tool 51 in order to break the protuberances 42 away from the remainder of such second portion.

It will be seen that the tool 51 can be used to apply a first torque $M_1$ (by way of the second portion including the protuberances 42) or to apply a different second torque $M_2$ by way of the third portion 52.

The illustrated solid hexagonal third portion 52 can be replaced with a hollow third portion, e.g., to further reduce the resistance which the portion 52 offers to deformation by the torque-transmitting part of a wrench which engages (e.g., with a certain amount of play but still in form-locking fashion) the facets 53a.

All in all, the tool 51 renders it possible to apply to a component 5 torque in three successive stages. The first stage can involve transmission of torque to the third portion 52 until the third portion is deformed at the edges 53 so that the wrench which was used to rotate the third section 52 begins to turn relative to the tool 51. The second stage can involve transmission of torque to the second portion until the protuberances 42 become separated from the remainder of the tool 51. The third stage involves rotation of the second portion (without the protuberances 52) by a wrench or another implement which form-lockingly engages the facets 2a while the facets 8 abut the adjacent facets 10 of the outer end portion of the head 4 of a component 5. The first stage can involve the application of a torque which is different from the torques that can be applied by way of the protuberances 42 and by way of the external facets 2, and the torque which is applied by way of the protuberances 42 can be different from that which is to be applied by way of the facets 2a.

The torquing tool 61 of FIGS. 12 and 13 exhibits the features of the tool 21 of FIG. 6 and the features of the tool 31 of FIG. 7. The axial length of the tool 61 is or can be approximately or exactly twice the axial length of the tool 21 or 31. The section which resembles the tool 31 is or can be provided with an internal projection 33, and the section which resembles the tool 21 is or can be provided with one or more external projections 22.

The section which resembles the tool 31 can be deformed by a wrench W or a similar implement so that its external edges 2 disappear (see FIG. 13), i.e., the section resembling the tool 31 is then converted into a body 31' having a cylindrical peripheral surface. This results in the application of a first torque $M_1$. Care should be taken to manipulate the wrench in such a way that its torque-transmitting part TTP receives only the section which resembles the tool 31. The thus obtained partially deformed tool 61' (FIG. 13) is thereupon used to apply additional torque $M_2$ by using a wrench with a torque-transmitting part which can engage the second portion (facets $2a$) of the section which resembles the tool 21. The second application of torque is terminated when the second portion of the section resembling the tool 21 has undergone deformation because the component 5 then offers to further rotation a resistance which entails a deformation of the tool 61' at 21. The torque $M_2$ can equal or can exceed the torque $M_1$. One and the same wrench can be used for both applications of torque if the depth of the torque-transmitting part of the wrench suffices to first deform the section resembling the tool 31 and to thereupon deform the section which resembles the tool 21. When the second application of torque is completed, the entire tool (namely a deformed tool 61') can resemble an elongated cylindrical body, i.e., an article having a substantially cylindrical external surface from end to end.

The torquing tool 71 of FIG. 14 resembles the tool 31 of FIG. 7 but further comprises a polygonal third portion in the form of a diametrically extending wing 54 which is integral with and is outwardly adjacent the end wall 32. The inner side of the end wall 32 may but need not be provided with a projection 33 and the facets $2a$ can but need not be provided with projections 22.

The edges $54a$ of the third portion 54 can be deformed by a suitable implement (e.g., a wrench) when the component 5 having a portion of its head in the first portion of the tool 71 offers a predetermined resistance to further rotation. For example, the third portion 54 can be deformed in response to the application of a torque $M_2$ which is less or at most equals the torque $M_1$. The torque $M_1$ is applied when the torque-transmitting part TTP of a wrench W begins to rotate about the second portion (including the facets $2a$) of the tool 71.

The tool 71 exhibits the same advantage as the tool 41 of FIG. 9, i.e., it is possible to apply a first torque by way of the second portion including the facets $2a$ or a different second torque by way of the third portion 54.

The improved torquing tool is susceptible of numerous additional modifications without departing from the spirit of the invention. For example, the tool 31 which is shown in FIGS. 7 and 8 can be deformed in several stages or steps so that it can apply a plurality of different torques. This can be achieved in that the torque-transmitting part TTP of a wrench W first engages only a part (e.g., one-half) of the second portion (including the external facets $2a$) of the tool 31. A next-following step then involves the application of torque (by the same wrench W or by a different implement) to the remaining part of the second portion. For example, one can employ first a wrench having a socket which can receive that half of the tool 31 which includes the end wall 32, and thereupon a wrench having a deeper socket which can receive the entire tool 31 all the way or close to its open end. Thus, even the relatively short tool 31 can be used in the same way as described above in connection with the tool 61 of FIGS. 12 and 13. The torque which is applied during the first stage of deformation of the second portion of the tool 31 can but need not be the same as that which is required to deform the remainder of the second portion of the tool 31.

It is further possible to apply to at least one portion of the improved torquing tool a film or layer of a material (e.g., paint) having a color which is different from the coated portion of the tool. This is shown, by way of example, in FIG. 2 where a legend is used to indicate a film of paint coating the facets $2a$ of the second portion of the tool 1. When the application of torque is completed, i.e., when the torque-transmitting part TTP of the wrench W has converted the second portion into a body having a substantially cylindrical peripheral surface, such deformation results in the peeling off of a portion of or the entire film so that a mere glance at the deformed second portion of the tool 1 suffices to indicate that the application of predetermined torque to the component 5 is already terminated. The color of the film can be totally different from the color of the second portion of the tool 1, or the color of the film can merely constitute a different hue of the color of the second portion. This feature can be used in each and every embodiment of the improved torquing tool. By way of example, the film can consist of a layer of pulverulent polyamide or a metallic layer which is deposited by sputtering, by vacuum evaporation or in any other suitable way.

It is further possible to bond the tool to the component which is to receive a predetermined torque. This is indicated in FIG. 3 by a legend denoting adhesive. Such bonding can be resorted to in addition to dimensioning of the first portion of the tool in such a way that it is a press fit or friction fit on the outer end portion of the head 4. In fact, it is even possible to make the first portion of the tool integral with the head 4 to thus even more reliably ensure that the deformed tool remains affixed to the component 5 when the application of torque is completed. For example, the tool can be molded directly onto a component 5 or onto an analogous component. This ensures that the component and the torquing tool cannot become accidentally separated during transport or in storage.

The component which receives torque from the improved tool need not be a bolt. It is equally possible to apply torque to a nut or to another component having a non-circular (preferably hexagonal or square) torque-receiving part. For example, the component 5 can be replaced with a threaded sleeve having a part with a polygonal external outline so that it can be engaged by the first portion of the improved tool. The first portion of the tool can fit into a socket of the torque-receiving part of a component which is to be rotated until it offers a predetermined resistance to further rotation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A torquing tool for applying a predetermined torque to bolts, nuts and analogous rotary components of the type having a non-circular torque receiving part which exhibits a first resistance to deformation, comprising a torque-transmitting first portion substantially complementary to and engageable with the torque-receiving part of a component; and a non-circular torque-receiving second portion engageable by a complementary torque-transmitting part of a wrench which latter exhibits a second resistance to deformation, said second portion being arranged to transmit torque to said first portion and at least one of said portions having an at least partially polygonal cross-sectional outline and including at least one facet and at least one edge adjacent said at least one facet, said at least one portion exhibiting a third resistance to deformation which is less than said first and second resistances so that, when the wrench rotates the second portion to apply torque to a component by way of said first portion, said at least one portion undergoes deformation in the region of said at least one edge and ceases to transmit torque when the component begins to offer a predetermined resistance to rotation.

2. The tool of claim 1, wherein said first portion is configurated to be form-lockingly connected with the torque-receiving part of a component.

3. The tool of claim 1, wherein said second portion is configurated to be form-lockingly connected with the torque-transmitting part of a wrench.

4. The tool of claim 1, wherein said at least one portion includes a plurality of facets and a plurality of edges alternating with said facets, said at least one portion undergoing deformation in the regions of at least two of said edges when the component offers said predetermined resistance to rotation.

5. The tool of claim 1 for applying predetermined torque to components with a torque-receiving part having a slot for the working end of a screwdriver, wherein said first portion includes a socket having an internal projection which enters the slot when the torque-receiving part of a component is received in said socket.

6. The tool of claim 1, wherein said first portion is dimensioned to be a press fit on the torque-receiving part of the component.

7. The tool of claim 1, further comprising means for securing said first portion to the torque-receiving part of a component.

8. The tool of claim 7, wherein said securing means is an adhesive.

9. The tool of claim 1, wherein said second portion has an external surface provided with at least one projection which is frictionally engageable by the torque-transmitting part of a wrench.

10. The tool of claim 1, wherein at least said at least one portion consists of a plastic material.

11. The tool of claim 1, wherein at least said at least one portion consists of a metallic material.

12. The tool of claim 11, wherein at least said at least one form consists of cast metal.

13. The tool of claim 1, further comprising means for facilitating visual determination of deformation of said at least one portion.

14. A torquing tool for applying a predetermined torque to bolts, nuts and analogous rotary components of the type having a non-circular torque receiving part which exhibits a first resistance to deformation, comprising a torque-transmitting first portion substantially complementary to and engageable with the torque-receiving part of a component; and a non-circular torque-receiving second portion having an external surface engageable by a complementary torque-transmitting part of a wrench which latter exhibits a second resistance to deformation, said external surface having at least one protuberance and said second portion being arranged to transmit torque to said first portion, at least one of said portions exhibiting a third resistance to deformation which is less than said first and second resistances so that, when the wrench rotates the second portion to apply torque to a component by way of said first portion, said at least one portion undergoes deformation and ceases to transmit torque when the component begins to offer a predetermined resistance to rotation, said at least one protuberance being separated from said second portion when the component offers said predetermined resistance to rotation while the torque-transmitting part of a wrench engages said external surface and applies torque to said second portion.

15. The tool of claim 14, wherein said surface has a plurality of facets and edges alternating with said facets, a protuberance being provided at each of said edges.

16. The tool of claim 14, further comprising a non-circular torque-receiving third portion adjacent and arranged to transmit torque to said second portion, said third portion being engageable by a complementary torque-transmitting part of a wrench to rotate said second portion and said third portion exhibiting a fourth resistance to deformation such that said third portion undergoes deformation when the component which is engaged by the first portion begins to offer to rotation a second resistance which at most equals said predetermined resistance.

17. The tool of claim 16, wherein said third portion becomes separated from said first and second portions when the component which is engaged by said first portion offers said second resistance to rotation.

18. A torquing tool for applying a predetermined torque to bolts, nuts and analogous rotary components of the type having a non-circular torque receiving part which exhibits a first resistance to deformation, comprising a torque transmitting first portion substantially complementary to and engageable with the torque-receiving part of a component; a non-circular torque-receiving second portion engageable by a complementary torque-transmitting part of a wrench which latter exhibits a second resistance to deformation, said second portion being arranged to transmit torque to said first portion and at least one of said portions exhibiting a third resistance to deformation which is less than said first and second resistances so that, when the wrench rotates the second portion to apply torque to a component by way of said first portion, said at least one portion undergoes deformation and ceases to transmit torque when the component begins to offer a predetermined resistance to rotation; and a non-circular torque-receiving third portion adjacent and arranged to transmit torque to said first and second portions, said third portion being engageable by a complementary torque-transmitting part of a wrench to rotate said first and second portions and said third portion exhibiting a fourth resistance to deformation such that said third portion undergoes deformation when the component which is engaged by the first portion begins to offer to rotation a second resistance which at most equals said predetermined resistance.

19. A torquing tool for applying a predetermined torque to bolts, nuts and analogous rotary components of the type having a non-circular torque receiving part which exhibits a first resistance to deformation, comprising a torque transmitting first portion substantially complementary to and engageable with the torque-receiving part of a component; a non-circular torque-receiving second portion engageable by a complementary torque-transmitting part of a wrench which latter exhibits a second resistance to deformation, said second portion being arranged to transmit torque to said first portion and at least one of said portions exhibiting a third resistance to deformation which is less than said first and second resistances so that, when the wrench rotates the second portion to apply torque to a component by way of said first portion, said at least one portion undergoes deformation and ceases to transmit torque when the component begins to offer a predetermined resistance to rotation, said at least one portion having a first color; and a film of a second color overlying said at least one portion, said film being at least partially removed in response to deformation of said at least one portion to expose said first color.

* * * * *